United States Patent
Ikeda et al.

(10) Patent No.: US 8,284,806 B2
(45) Date of Patent: Oct. 9, 2012

(54) APPARATUS AND METHOD FOR MANUFACTURING LIGHT SOURCE

(75) Inventors: Kazutaka Ikeda, Chiyoda-ku (JP); Shinichi Oe, Chiyoda-ku (JP); Akira Nakamura, Chiyoda-ku (JP); Motoaki Tamaya, Chiyoda-ku (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 174 days.

(21) Appl. No.: 12/852,281

(22) Filed: Aug. 6, 2010

(65) Prior Publication Data

US 2011/0122898 A1    May 26, 2011

(30) Foreign Application Priority Data

Nov. 26, 2009   (JP) .................................. 2009-268681

(51) Int. Cl.
*H01S 3/10*    (2006.01)
(52) U.S. Cl. .............................. 372/20; 372/21; 372/22
(58) Field of Classification Search ............... 372/20, 372/21, 22, 29.014, 29.021, 29.022, 38.02
See application file for complete search history.

(56) References Cited

FOREIGN PATENT DOCUMENTS

| JP | 63-121829 A | 5/1988 |
|---|---|---|
| JP | 1-180507 A | 7/1989 |
| JP | 6-244482 A | 9/1994 |

OTHER PUBLICATIONS

Notice of Reason(s) of Refusal issued by the Japanese Patent Office on Feb. 7, 2012 in corresponding Japanese Patent Application No. 2009-268681, and English translation thereof.

*Primary Examiner* — Armando Rodriguez
(74) *Attorney, Agent, or Firm* — Buchanan Ingersoll & Rooney PC

(57) ABSTRACT

Because a reflector that reflects a fundamental wave generated from a solid-state laser element and forms an optical resonator is disposed on an exit surface of a wavelength conversion element, the fundamental wave cannot be resonated and amplified in a stage before the wavelength conversion element is joined to the solid-state laser element. As a result, a problem is created in that the solid-state laser element emits low level light output, so that a relative position of the semiconductor laser and the solid-state laser element cannot properly be adjusted. In order to overcome the above problem, even in the stage before joining the wavelength conversion element to the solid-state laser element, the invention enables the semiconductor laser and the solid-state laser element to be joined by properly adjusting the relative position of the laser and the laser element. A second reflector is provided that is located opposite a first reflector of the solid-state laser element and that partially transmits through the fundamental wave emitted from the solid-state laser element and reflects the rest of the wave. The semiconductor laser and the solid-state laser element are joined together at a relative position such that the output of light having passed through the second reflector reaches or exceeds a predetermined value.

12 Claims, 9 Drawing Sheets

FIG. 6

| Process | Adjustment level | Laser output |
|---|---|---|
| First adjustment process | Coarse adjustment | P1 |
| Mirror adjustment process | – | P1 |
| Second adjustment process | Fine adjustment | P2 |
| Joining process | – | P2 |

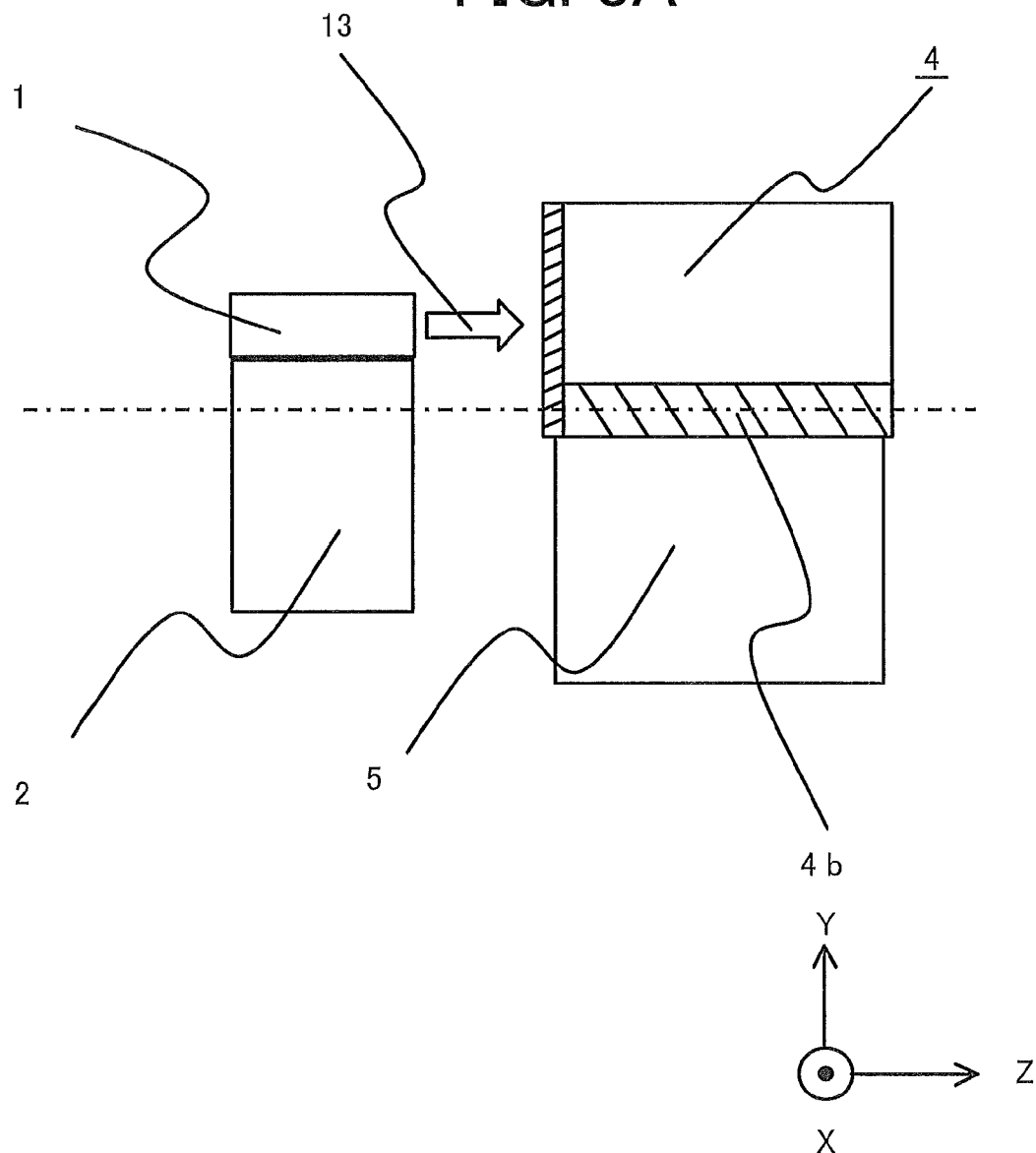

APPARATUS AND METHOD FOR MANUFACTURING LIGHT SOURCE

FIELD OF THE INVENTION

The present invention relates to methods and apparatuses for manufacturing a light source including a semiconductor laser, a solid-state laser element and a wavelength conversion element, and more particularly to the light source manufacture methods and apparatuses where a relative position of the semiconductor laser and the solid-state laser element is adjusted to achieve optical coupling between them.

BACKGROUND OF THE INVENTION

There exists a light source for use in a projection television set and the like, which is configured with a semiconductor laser, a solid-state laser element, and a wavelength conversion element, to generate a fundamental wave of the specific wavelength from the solid-state laser element by causing pump light emitted from the semiconductor laser to strike on the solid-state laser element, so that high output green light and blue light are provided by converting the generated fundamental wave into another one using the wavelength conversion element. As a light source described above, there exists a device which is designed so that an optical resonator is formed between a reflector reflecting the fundamental wave disposed on a surface located toward the semiconductor laser, of the solid-state laser element and a reflector reflecting of fundamental wave disposed on a light exit surface of the wavelength conversion element, to thereby resonate and amplify the fundamental wave, whereby the wavelength conversion at the wavelength conversion element can be achieved with high efficiency (refer to Japanese Unexamined Patent Application Publication No. S63-121829, which is hereinafter called Patent Document 1).

These light sources are designed so that the semiconductor laser and the solid-state laser element are joined together with them disposed at proper relative positions with respect to each other, and thereafter the wavelength conversion element is joined to the joined element of the semiconductor laser and the solid-state laser element, with the conversion element disposed at a proper relative position with respect to the joined element. There exists a method called active alignment that is used to adjust to proper relative positions, optical elements, such as a semiconductor laser, a solid-state laser element, a wavelength conversion element, and an optical fiber. In an example of this method, a relative position of the semiconductor laser and the optical fiber is adjusted so as to maximize the output of light that has been emitted from the semiconductor laser and then has passed through the optical fiber (refer to Japanese Unexamined Patent Application Publication No. H01-180507, which is hereinafter called Patent Document 2).

However, Patent Document 1 discloses that since the reflector that reflects the fundamental wave generated from the solid-state laser element is provided at an exit surface of the wavelength conversion element, to form the optical resonator, the fundamental wave (laser light) cannot be resonated and amplified in a stage (phase) before joining the wavelength conversion element to the solid-state element. Thus, a problem is created in that the solid-state laser element emits low level light output and a relative position of the semiconductor laser element, so that the solid-state laser element cannot properly be adjusted even using the method of Patent Document 2.

SUMMARY OF THE INVENTION

The present invention is directed to overcome the above problem, and an object thereof is to join together a semiconductor laser and a solid laser element with a relative position of the laser and the laser element being properly adjusted.

A light source manufacture apparatus according to the present invention manufactures a light source including a semiconductor laser that is energized to emit pump light; a solid-state laser element that generates a fundamental wave based on the pump light, the solid-state laser element having a first reflector that is provided on a surface thereof located toward the semiconductor laser, the first reflector reflecting the fundamental wave, and; a wavelength conversion element that emits light with the wavelength of the fundamental wave converted into another wavelength. The light source manufacture apparatus comprises a first retainer that retains the semiconductor laser; a second retainer that retains the solid-state laser element at a location that is illuminated by the pump light emitted from the semiconductor laser; a second reflector that is provided opposite the first reflector of the solid-state laser element retained by the second retainer, the second reflector causing the fundamental wave emitted from the solid-state laser element to partially transmit therethrough and causing a rest of the fundamental wave to reflect thereby; a light output measurement device that measures an output of light having passed through the second reflector; a movement controller that causes the first retainer and/or the second retainer to shift so that the semiconductor laser and the solid-state laser element are disposed at a relative position where the light output measured using the light output measurement device reaches or exceeds a predetermined value; and a joining device that joins the semiconductor laser and the solid-state laser element together at a relative position where the light output measured using the light output measurement device reaches or exceeds the predetermined value.

Furthermore, a light source manufacture method according to the present invention is a method of manufacturing a light source that includes a semiconductor laser that is energized to emit pump light; a solid-state laser element that generates a fundamental wave based on the pump light, the solid-state laser element having a first reflector that is provided on a surface thereof located toward the semiconductor laser, the first reflector reflecting the fundamental wave, and; a wavelength conversion element that emits light with the wavelength of the fundamental wave converted into another wavelength. The light source manufacture method comprises a first step of retaining the semiconductor laser, a second step of retaining the solid-state laser element that is illuminated by the pump light emitted from the semiconductor laser so that the first reflector is disposed at a location opposite a second reflector that causes the fundamental wave to partially transmit therethrough and causes a rest of the fundamental wave to reflect thereby, a step of energizing the semiconductor laser and then emitting pump light, a step of causing the first retainer and/or the second retainer to move so that the semiconductor laser and the solid-state laser element are disposed at a relative position where the output of light passing through the second reflector reaches or exceeds a predetermined value; and a step of joining the semiconductor laser and the solid-state laser element at a relative position such that the output of light passing through the second reflector reaches or exceeds the predetermined value.

According to the invention, the amount of light emitted from the solid-state laser element is allowed to be adequately measured. Thus, the relative position of the semiconductor laser and the solid-state laser element can properly be adjusted to join them together. These and other objects of the present invention will be better understood by reading the following detailed description in combination with the attached drawings of a preferred embodiment of the invention.

BRIEF DESCRIPTION OF THE DRAWINGS

FIG. 6 is a table illustrating adjustment processes, and an adjustment level and a laser output for each process, in the light source manufacture apparatus according to Embodiment 1 of the present invention;

FIG. 8A is a diagrammatic view for illustrating an example where a relative position of the semiconductor laser and the solid-state laser element is varied;

DESCRIPTION OF THE PREFERRED EMBODIMENTS

Embodiment 1

Figure 1:
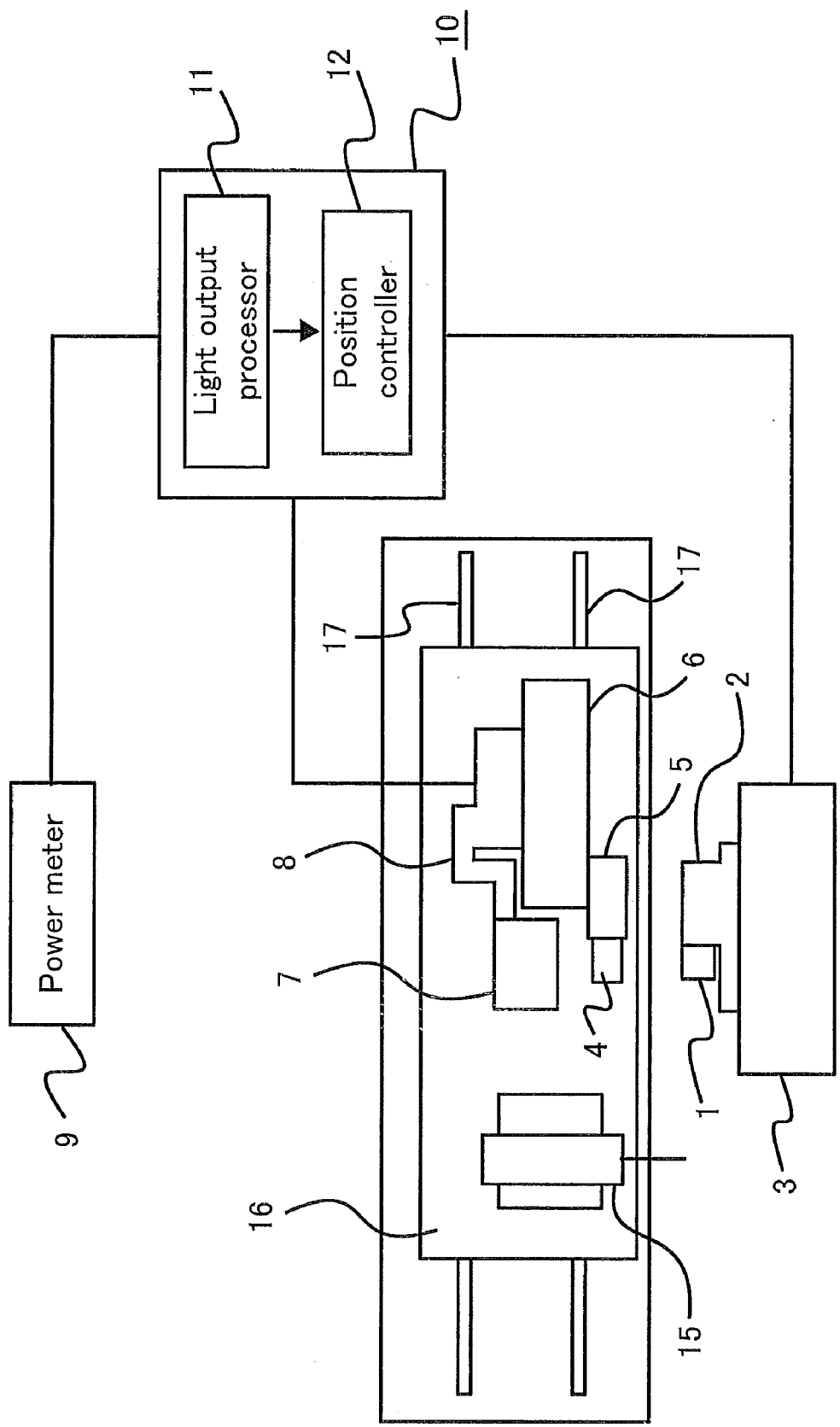
FIG. 1 is a schematic diagram illustrating a light source manufacture apparatus according to Embodiment 1 of the present invention.

FIG. 1 is a schematic diagram illustrating a light-source manufacture apparatus where optical coupling between a semiconductor laser (hereinafter called LD) and a solid-state laser element is made by adjusting their relative position, according to Embodiment 1 of the present invention. Here, the optical coupling refers to a condition in which light emitted from a semiconductor laser is to enter a solid-state laser element without any energy loss. A light source manufactured with the light source manufacture apparatus according to Embodiment 1 of the present invention can be used for, e.g., a projection television set and the like.

Referring to FIG. 1, the light source manufacture apparatus includes a stationary stage 6 having a second retainer 5 retaining a solid-state laser element 4; a moving stage 3, having a first retainer 2 retaining an LD 1, that shifts with respect to the stationary stage; a partial reflective mirror 7 that partially reflects light emitted from the solid-state laser element; an angle adjustment stage 8 that adjusts an angle of inclination of the partial reflective mirror 7; a power meter 9 that measures an output of light having passed through the partial reflective mirror; a controller 10 that controls a moving stage 3, the angle adjustment stage 8 and the power meter 9; a dispenser 15 that applies a proper amount of adhesive serving as a joining material to a portion of the LD 1 where the solid-state laser element 4 is caused to join; a position change mechanism 16 where the dispenser 15 and the stationary stage 6 are disposed, that moves the stationary stage to come in a position above the LD 1 in an adjustment process where the relative position of the LD 1 and the solid-state laser element 4 is adjusted, and that moves the dispenser 15 to come in a position above the LD 1 in an adhesion process where a proper amount of adhesive is applied to a joined portion of the LD 1 and the solid-state laser element 4; and a rail 17 engaged with the position change mechanism 16, that extends in a shift direction of the mechanism 16. Here, a joining device is configured with the first retainer 2, the moving stage 3, the second retainer 5, the stationary stage 6, the controller 10, the dispenser 15, the position change mechanism 16 and the rail 17.

The first retainer 2, which is disposed on the moving stage 3, retains the LD 1 with a sucking mechanism or a capture mechanism, both not shown. The LD 1 emits pump light by being energized by an energizing circuit, not shown, serving as an electric power controller. The moving stage 3 is configured to be able to move relative to the stationary stage 6 in response to signals from the controller 10; thus, the relative position of the LD 1 and the solid-state laser element 4 is adjusted by the movement of the moving stage 3. The second retainer 5, which is placed on the stationary stage 6, retains the solid-state laser element 4 with the unillustrated sucking mechanism or capture mechanism.

Figure 2:
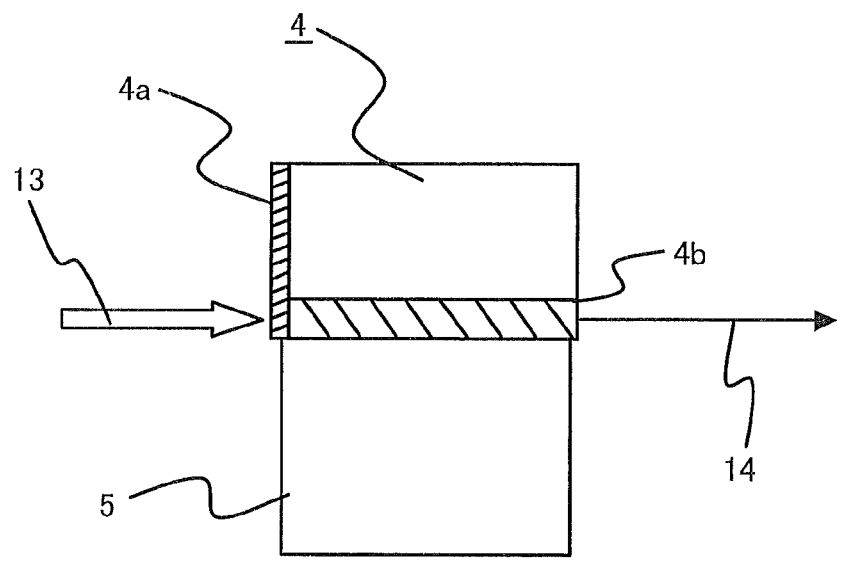
FIG. 2 is a schematic diagram illustrating a structure of a solid-state laser element configuring a light source to be manufactured with the light source manufacture apparatus according to Embodiment 1 of the present invention.

The solid-state laser element 4 generates a fundamental wave having the wavelength specific to the element 4 using pump light that has entered it from the LD 1. FIG. 2 is a schematic diagram illustrating a structure of the solid-state laser element 4, showing a 90 degree clockwise rotation of the solid-state laser element 4 from that shown in FIG. 1. Pump light 13 from the LD 1, which has struck on the solid-state laser element 4, propagates within the optical waveguide 4b, whereby an optical waveguide 4b is optically pumped to generate a fundamental wave 14, and then the fundamental wave 14 generated is emitted from the solid-state laser element 4. An optical film 4a, which is a first reflector formed by coating a surface, located toward the LD 1, of the solid-state laser element, is configured to pass through the pump light 13 emitted from the LD 1 as well as to reflect the fundamental wave 14 having propagated through the optical waveguide 4b.

The partial reflective mirror 7 is a second reflector that forms a resonator between itself and the optical film 4a of the solid-state laser element 4 and that causes light emitted from the solid-state laser element 4 to partially pass therethrough and reflect a rest of the light thereby. In situations where the solid-state laser element 4 is operated as a part of the light source, together with a wavelength conversion element (hereinafter called SHG), a reflector formed on an exit surface of the SHG is configured to be 100% in reflection rate (reflectivity) of a fundamental wave generated by the solid-state laser element 4, and to be higher in transmission rate (transmittance) of a laser light after the wavelength change. However, setting the reflectivity of the partial reflective mirror 7 with respect to the fundamental wave to 100% results in the fundamental wave incapable of being observed with the power meter 9. For that reason, the partial reflective mirror 7 is configured to partially pass the mirror 7, such that when the fundamental wave having a wavelength of, e.g., 1064 nm strikes on the partial reflective mirror 7, the partial reflective mirror 7 has a reflectivity of 80% and a transmittance of 20% for such a fundamental wave, and the reflectivity for another wavelength of an incident light thereto becomes lower as the another wavelength is farther apart from 1064 nm. The partial reflective mirror 7 like this can be configured by forming an optical reflective film on a surface of, for instance, BK7 glass or fused silica glass. The angle adjustment stage 8, which is placed on the stationary stage 6, adjusts an angle of inclination of the partial reflective mirror 7 according to signals from the controller 10. Even when there is an angular deviation in fixing the solid-state laser element 4 with respect to the partial reflective mirror 7, the angle adjustment stage 8 allows the optical film 4a and the partial reflective mirror 7 to be substantially in parallel, which enables formation of a resonator.

The power meter 9, which is disposed at a position higher than the partial reflective mirror 7, is a light output measurement device that measures an output of light emitted from the solid-state laser element 4, and delivers light output information to the controller 10. The controller 10 controls the moving stage 3, the angle adjustment stage 8 and the power meter 9, based on the light output information from the power meter 9. The controller 10 is configured with a light output processor 11 and a position controller 12. The light output processor 11 receives the light output information from the power meter 9, to delivers the information to the position controller 12. The position controller 12 adjusts a relative position of the moving stage 3 and the stationary stage 6 by controlling the position of the moving stage based on the information received from the light output processor 11. The controller 10 also adjusts indirectly an angle of inclination of the partial reflective mirror 7 by controlling a position of the angle adjustment stage based on the information received from the light output processor 11.

Figure 3:
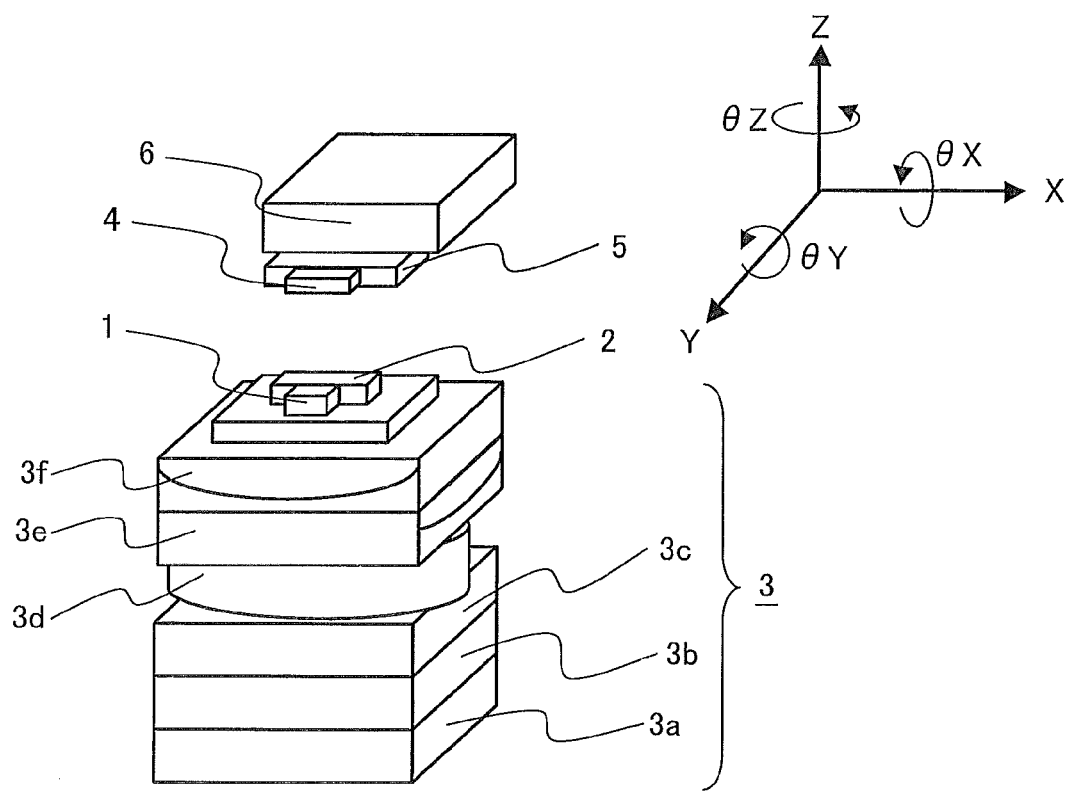
FIG. 3 is a diagrammatic illustration showing an axial configuration of a moving stage in the light source manufacture apparatus according to Embodiment 1 of the present invention.

FIG. 3 is a perspective schematic view illustrating an axial configuration of the moving stage 3. Components that are the same as or corresponding to the components in FIG. 1 bear the same numerals, and their description is not provided herein. Referring to FIG. 3, the moving stage 3 is configured with a Z-axis stage 3a to move in the Z direction; an X-axis stage 3b to move in the X direction; a Y-axis stage 3c to move in the Y direction; a rotation stage 3d to rotate about the Z axis, which is a rotation in the θz direction; a θx goniometric stage 3e to rotate about the X axis, which is a rotation in the θx direction; and a θy goniometric stage 3f to rotate about the Y axis, which is a rotation in the θy direction. The movement of each stage allows the shift of the LD 1 retained on the moving stage 3.

Figure 4:
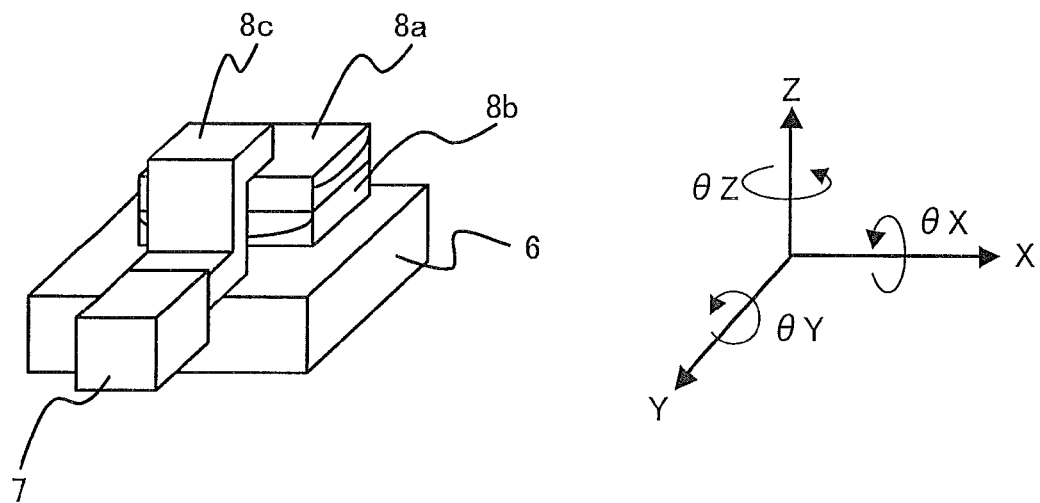
FIG. 4 is a perspective schematic view illustrating an axial configuration of an angle adjustment stage in the light source manufacture apparatus according to Embodiment 1 of the present invention.

FIG. 4 is a perspective schematic view illustrating an eight-axis configuration of the angle adjustment stage 8. Referring to FIG. 4, the angle adjustment stage 8 is configured with a θy goniometric stage 8b provided on the stationary stage 6, a θx goniometric stage 8a provided on the θy goniometric stage 8b, and an L-shaped jig 8c with its one end fixed to the upper surface of the θx goniometric stage 8a and with its other end to which the solid-state laser element 4 is fixed. Each stage constituting the angle adjustment stage 8 is configured to move in its corresponding shift direction (θx or θy direction), so that the movement of each stage can vary the angle of the partial reflective mirror 7 retained on the angle adjustment stage 8.

Figure 5:
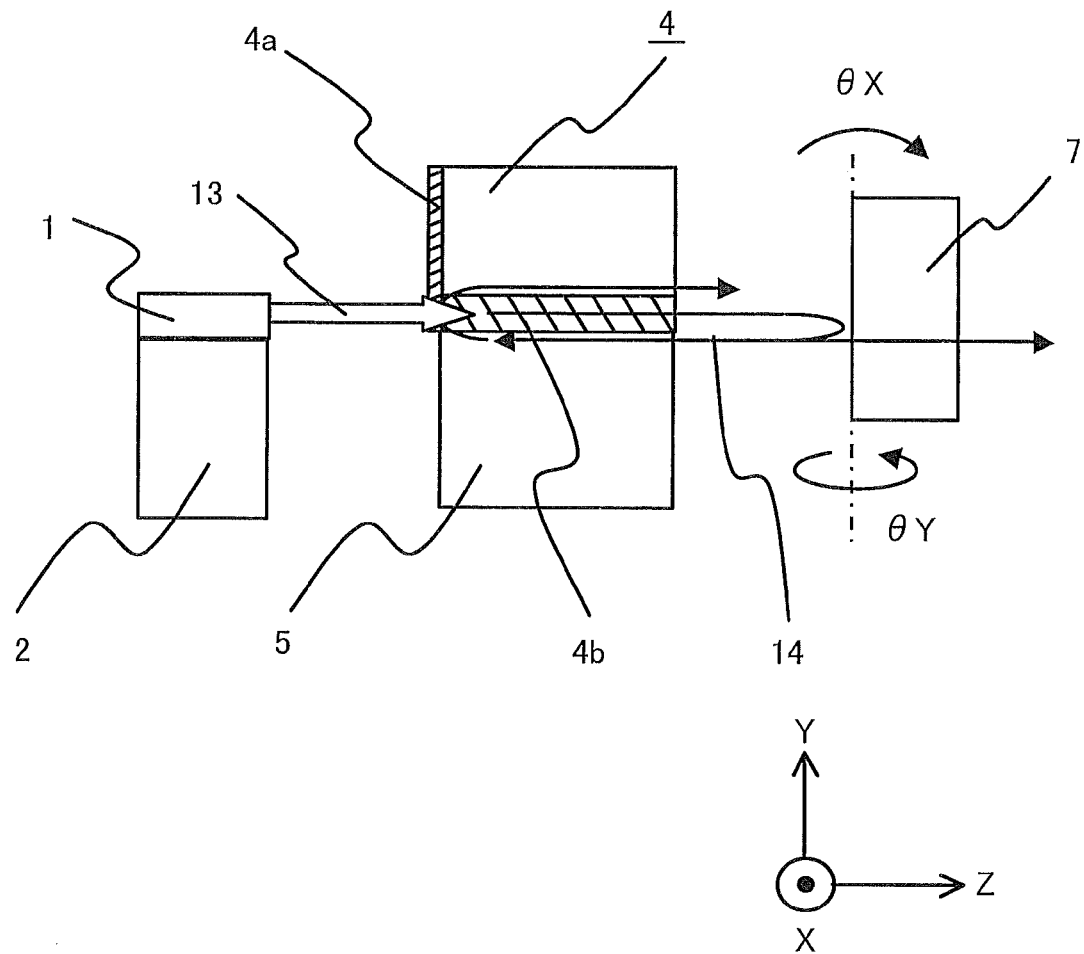
FIG. 5 is a schematic diagram illustrating relative positional relationships among and between a semiconductor laser, a solid-state laser element and a partial reflective mirror, established when a semiconductor laser and a solid-state laser element are mounted on the light source manufacture apparatus according to Embodiment 1 of the present invention.

FIG. 5 is a schematic diagram illustrating relative positional relationships among and between the LD 1, the solid-state laser element 4 and the partial reflective mirror 7, established when the LD 1 is mounted on the first retainer 2 and the second retainer 5 on the solid-state laser element 4. The LD 1 is connected to the energizing circuit, not shown; the energization of the LD 1 by the circuit causes the LD 1 to emit the pump light 13 (a wavelength of 808 nm). The pump light 13 emitted from the LD 1 enters the optical waveguide 4b formed in the solid-state laser element 4, through the optical film 4a coated on the surface, located toward the LD 1, of the solid-state laser element 4, and propagates within the optical waveguide 4b, whereby the optical waveguide 4b is optically pumped to generate the fundamental wave (a wavelength of 1064 nm).

The partial reflective mirror 7, which is disposed at a position located above the optical film 4a and spaced apart by a predetermined distance, is adjusted to come in a position in parallel with the optical film 4a of the solid-state laser element 4 using the angle adjustment stage 8. It will generally suffice if the partial reflective mirror 7 is disposed to come in a position spaced apart from the exit surface of the solid-state laser element 4 by a few tens of micrometers to 100 micrometers. After passing through the optical waveguide 4b, the generated fundamental wave 14 transmits at a constant rate through the partial reflective mirror 7 provided on the exit end of the solid-state laser element 4, while the rest of the fundamental wave 14 is reflected by the mirror 7. The fundamental wave 14 that has been reflected again reaches the optical waveguide 4b of the solid-state laser element 4 and is totally internally reflected, after its light output has been amplified, by the optical film 4a on the surface, located toward the LD 1, of the solid-state laser element 4. High output laser lights are achieved by thusly forming the optical resonator for the fundamental wave 14 between the optical film 4a and the partial reflective mirror 7, to create a laser oscillation. Mounting the partial reflective mirror 7 as described above provides the fundamental wave 14 having a light output that is sufficiently measurable with the power meter 9, thus enabling optimum active alignment.

Next, operation of the apparatus will be described. FIG. 6 is a table illustrating adjustment and joining processes, and an adjustment level and a laser output in each process, according to Embodiment 1 of the present invention. In the light source manufacture apparatus, a first adjustment process, a mirror adjustment process, a second adjustment process and a joining process are performed in that order. In the first adjustment process, coarse adjustment is made for the LD 1 and the solid-state laser element 4 to come in a proper position, with the LD 1 output power set to a low output power P1. Here, the proper position refers to a position where an output of the fundamental wave to be emitted from the solid-state laser element 4 reaches or exceeds a predetermined value, where the output of the light depends on conditions such as an optical axis, a laser mode, and a light wavelength. In the mirror adjustment process, inclination angle adjustment is made for the partial reflective mirror 7 to be substantially in parallel with the optical film 4a. In the second adjustment process, fine adjustment is made for the LD 1 and the solid-state laser element 4 to come in the proper position with the LD 1 set to produce an output power P2 to be produced when the LD 1 is operated as a part of the light source. In the joining process, the LD 1 is joined with the solid-state laser element 4. Each of the processes will be described in turn below.

Figure 7:
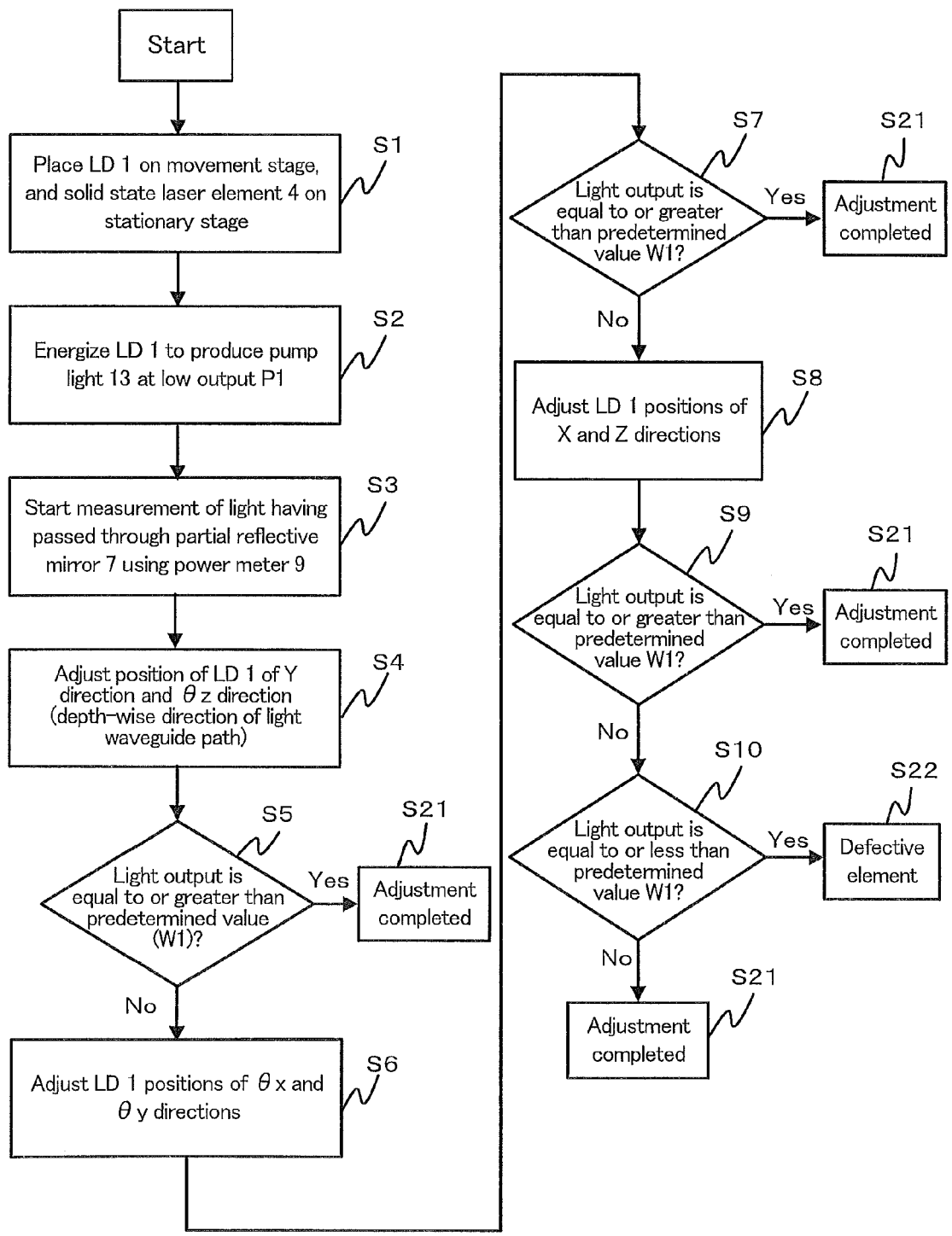
FIG. 7 is a flow chart illustrating a first adjustment process in the light source manufacture apparatus according to Embodiment 1 of the present invention.

FIG. 7 is a flow chart illustrating detailed processing steps in the first adjustment process. First, before the first adjustment process, the LD 1 and the solid-state laser element 4 are disposed on the moving stage 3 and the stationary stage 6, respectively, using hands or a carriage mechanism, not shown (S1). Next, in the first adjustment process, the LD 1 is energized so that the pump light 13 is emitted with the low output power P1 causing no damages to the LD 1 and the solid-state laser element 4 (S2). The low output power P1 is set to be on the order of 30% of the output power P2 to be produced when the LD 1 is operated as a part of the light source. Also, the power meter 9 starts the measurement of the output of light having passed through the partial reflective mirror starts with the power meter 9 (S3).

Figure 8B:
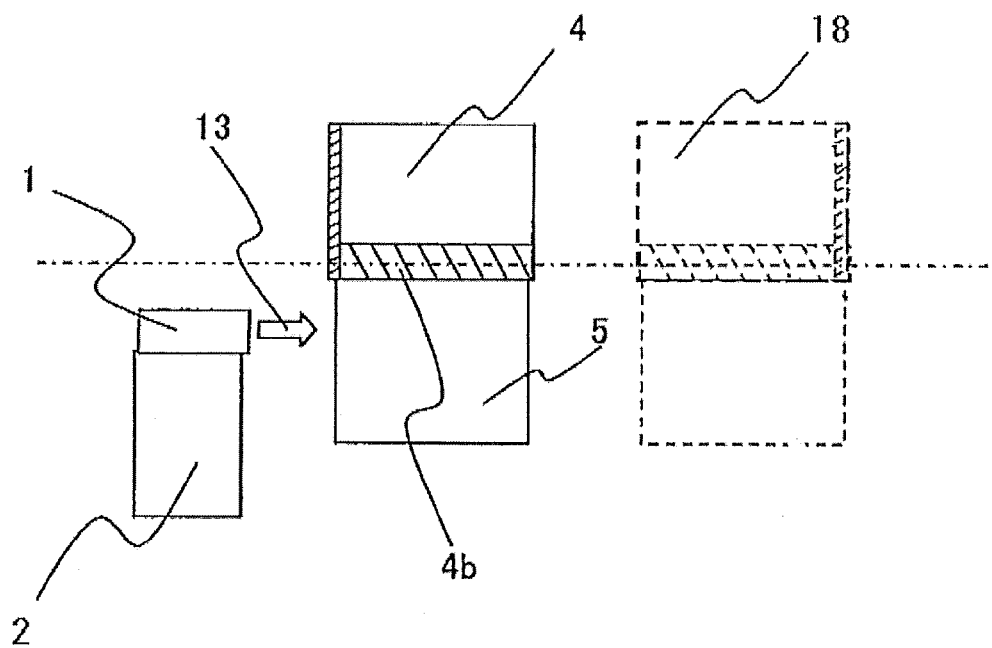
FIG. 8B is a diagrammatic view for illustrating another example where the relative position of the semiconductor laser and the solid-state laser element is varied.

Subsequently, the active alignment for each moving stage is made by finely moving the moving stage 3 in each of the six directions—X, Y and Z directions, and $\theta x$, $\theta y$ and $\theta z$ directions. FIGS. 8A and 8B are cross-sectional views taken along a plane defined by the Y and Z axes, each illustrating an example where the relative position of the LD 1 and the solid-state laser element is varied. Since the optical waveguide 4b of the solid-state laser element 4 is constructed to be wide in the X axis direction and narrow in the Y axis direction, no sufficient light output will be provided if the positions of the LD 1 and the solid-state laser element 4 are displaced in the Y direction. In fact, however, because as shown in FIGS. 8A and 8B, an unadjusted position of the LD 1 may in some cases be significantly shifted relative to that of the solid-state laser element 4, adjustments of the optical axes in the Y direction and $\theta z$ direction (depth-wise direction of the optical waveguide) are made so that the pump light from the LD 1 adequately enters the light waveguide 4b of the solid-state laser element 4 (S4). As a result, if the light output measured with the power meter 9 reaches or exceeds a predetermined value W1 (corresponding to "Yes" in S5), then the first adjustment process is completed for a sufficient light output being provided, and processing moves to the mirror adjustment process (S21). The predetermined value W1 is set to be equal to or greater than a value that corresponds to a predetermined rate (the portion of the low output power P1 to the output power P2, e.g., 30%) of the light output that is needed when the output of the light passing through the partial reflective mirror 7 serves as the light source.

If the light output measured with the power meter 9 is smaller than the predetermined value W1 (No in S5), the directions of $\theta x$ and $\theta y$ are adjusted to optimize the angle of incident pump light from the LD 1. As a result, if the light output measured with the power meter 9 reaches or exceeds the predetermined value W1 ("Yes" in S7), then this adjustment process is completed for the sufficient light output being provided (S21). If the light output measured with the power meter 9 is smaller than the predetermined value W1 ("No" in S7), then the X and Z directions are adjusted finally (S8). As a result, if the light output to be measured with the power meter 9 reaches or exceeds the predetermined value W1 ("Yes" in S9), then this adjustment process is completed for the sufficient light output being provided (S21). If the light output measured with the power meter 9 is smaller than the predetermined value W1 ("No" in S9), then whether the light output to be measured with the power meter 9 reaches or fall below the predetermined value W2 is subsequently determined, and if it reaches or falls below the predetermined value W2 ("Yes" in S10), then this adjustment process is completed for any one of the elements being defective (S22). If the amount of light measured with the power meter 9 is greater than the predetermined value W2 ("No" in S10), then the adjustment process is completed for sufficient light output being achieved (S21). Here, the predetermined value W2 is set to a value corresponding to a predetermined rate, e.g., 50% of the predetermined value W1. Such values are determined based on experimentally assessed results.

In this way, even when the initial and unadjusted relative positional relationship between LD 1 and the solid-state laser element 4 has been significantly different from what it should be, the damages of the laser element 4 and the LD 1 can be prevented by coarsely pre-adjusting the positional relationship between the LD 1 and the element 4 with the low output power P1 that causes no damage to them, which allows for reduction in occurrence of a defective element. What is described thus far is the first adjustment process.

In FIG. 7, the adjustment process is completed with the light output of the power meter 9 reaching or exceeding a certain value, and the reason for this is to reduce the adjustment period of time. If time permitted and the active alignments are performed for all the axes to determine the position where the light output reaches a maximum level, then more accurate adjustment can be made.

Figure 9A:
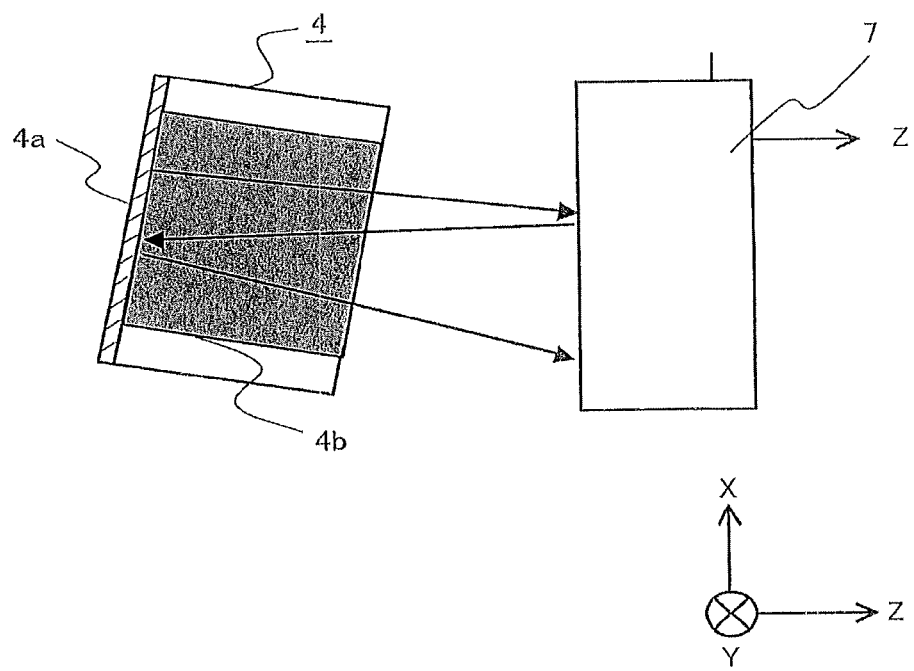
FIG. 9A is a schematic diagram illustrating an optical film of the solid-state laser element and the partial reflective mirror, with both disposed out of parallel with each other.
Figure 9B:
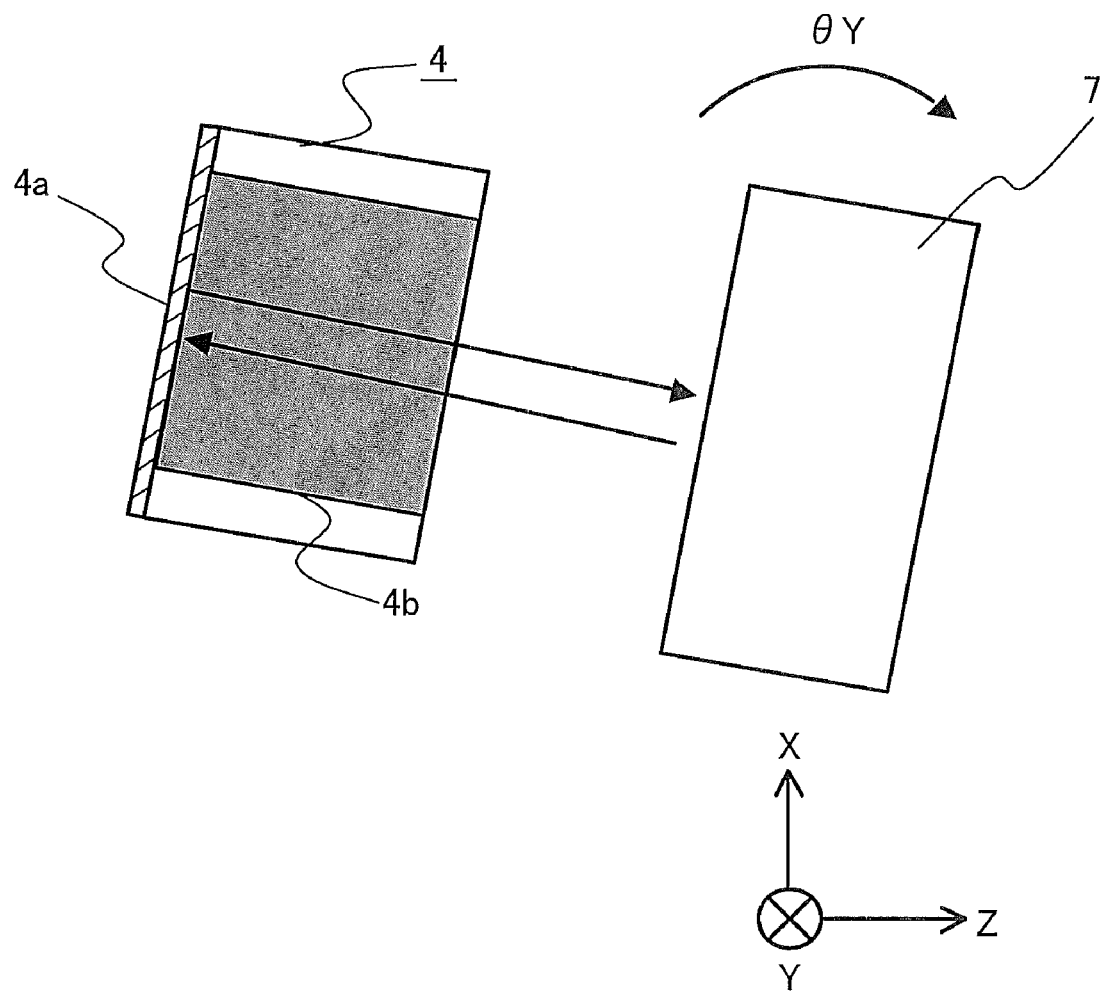
FIG. 9B is a schematic diagram illustrating the optical film of the solid-state laser element and the partial reflective mirror, with both disposed in parallel.

Upon completion of the first adjustment process, processing moves to the mirror adjustment process. FIG. 9A is a cross sectional view taken along a plane defined by the X and Z axes, illustrating the optical film 4a of the solid-state laser element 4 and the partial reflective mirror 7 being out of parallel, while FIG. 9B is another cross sectional view taken along a plane defined by the X and Z axes, illustrating the optical film 4a and the partial reflective mirror 7 being in parallel. The output of the fundamental wave reaches a maximum level when the optical film 4a on a surface, located toward the LD 1, of the solid-state laser element 4 and the partial reflective mirror 7 are in parallel; however, if the retention angle of the solid-state laser element 4 with respect to the stationary stage 6 varies as shown in FIG. 9A, the optical film 4a and the partial reflective mirror 7 are positioned out of parallel, thus resulting in the intended fundamental wave output being not produced. For that reason, with the LD 1 being emitted at the low output power P1, the partial reflective mirror 7 is caused to finely rotate in the $\theta y$ direction as shown in FIG. 9b so as to ascertain its inclination angle for maximizing the output of the fundamental wave, and the mirror 7 is then moved to the position at the inclination angle. As is described with reference to FIG. 9B, the partial reflective mirror 7 having been displaced in the $\theta y$ direction is finely rotated back in the $\theta y$ direction, while if the position of the mirror 7 has been displaced in the $\theta x$ direction, the mirror 7 can be positioned in parallel with the optical film 4a by causing it to finely rotate back in the $\theta x$ direction. In this way, even in situations where there exist an angular deviation in the fixed angle of the solid-state laser element 4 with respect to the partial reflective mirror 7, the optimum configuration of the optical resonator can be achieved by adjusting the positional (angular) relationship between the solid-state laser element 4 and the mirror 7, which eliminates the influence of variation in positional accuracy of the solid-state laser element, thus allowing controlled variation in the light output (performance management of the solid-state laser element). What is described thus far is the mirror adjustment process.

Figure 10:
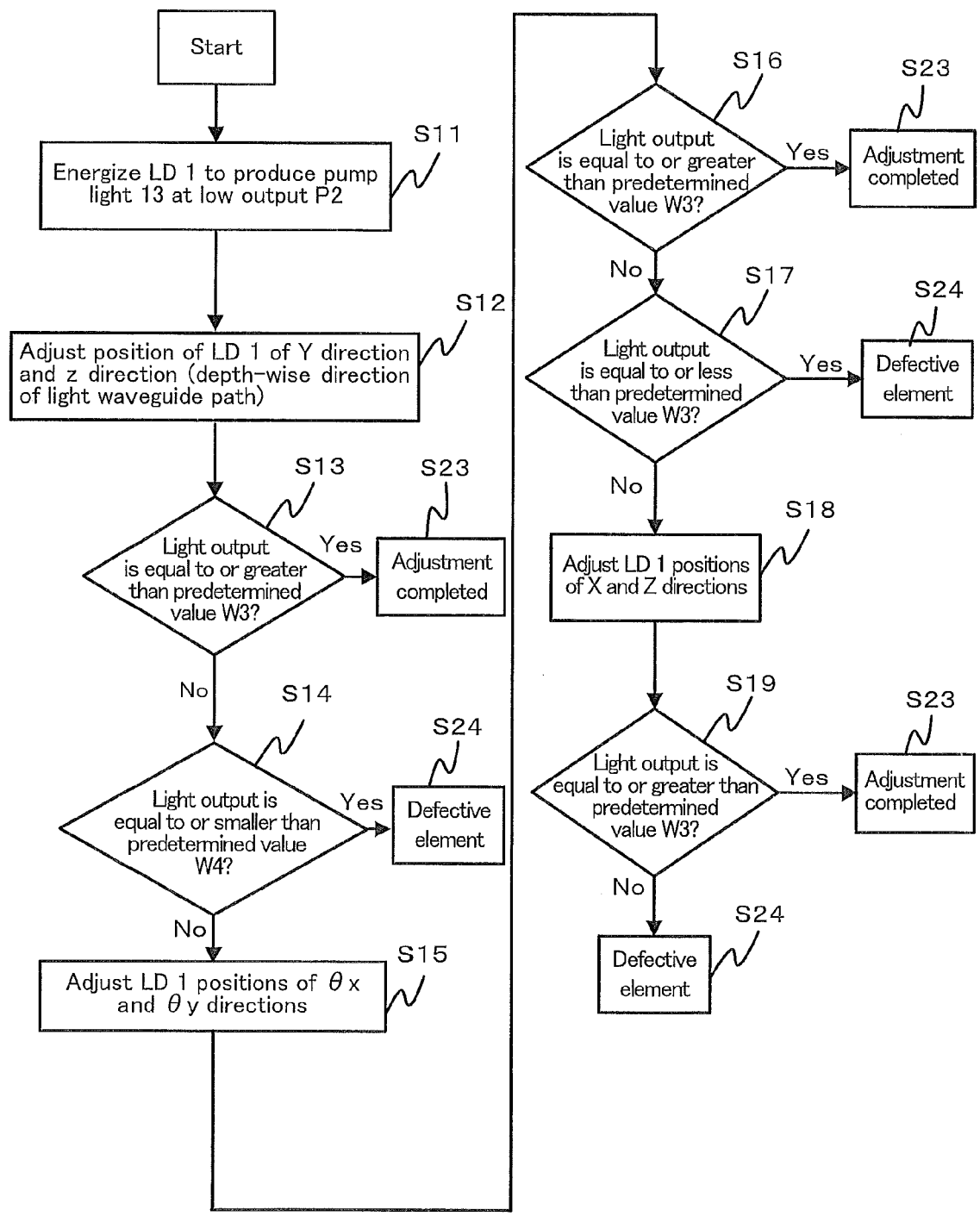
FIG. 10 is a flow chart illustrating a second adjustment process in the light source manufacture apparatus according to Embodiment 1 of the present invention.

Upon completion of the mirror adjustment process, processing moves to the second adjustment process. FIG. 10 is a flow chart illustrating detailed processing steps in the second adjustment process. In the first adjustment process, the pump light 13 emitted at the low output power P1 is caused to strike on the solid-state laser element 4, while in the second adjustment process the pump light 13 emitted at the output power P2 to be adopted when the LD 1 operates as a part of the light source is caused to enter the solid-state laser element 4. First of all, in the second adjustment process, the LD 1 is energized so that the pump light 13 is produced at the output power P2 to be adopted when the LD 1 operates as a part of the light source (S11).

Subsequently, the active alignment for each moving stage is made by finely moving the moving stage 3 in the six directions—X, Y and Z directions, and θx, θy and θz directions. First, the adjustments of the optical axes in the Y direction of the LD 1 and in the θz direction (depth-wise direction of the optical waveguide) are made so that the amount of the light output to be measured with the power meter 9 becomes a maximum (S12). As a result, if the light output to be measured with the power meter 9 reaches or exceeds a predetermined value W3 ("Yes" in S13), then the second adjustment process is completed for the sufficient light output being provided (S23).

If the light output measured with the power meter 9 is smaller than the predetermined value W3 ("No" in S13), then whether the light output measured therewith reaches or fall below the predetermined value W4 ("Yes" in S14) is subsequently determined, and if the light output measured therewith has reached or fallen below the predetermined value W4 ("Yes" in S14), then the adjustment process is completed for any one of the elements being defective (S24). Here, the predetermined value W3 is set to be equal to or greater than the amount of light output that is needed when the output of the light passing through the partial reflective mirror 7 operates as the light source. Further, a predetermined value W4 is set to a value that corresponds to a predetermined rate (e.g., 50%) of the predetermined value W3. Such values are determined based on experimentally assessed results.

The light output measured with the power meter 9 is greater than the predetermined value W4 ("No" in S14), the θx and θy directions is adjusted in order to optimize the angle of incident pump light from the LD 1. As a result, if the light output to be measured with the power meter 9 reaches or exceeds the predetermined value W3 ("Yes" in S16), then the adjustment process is completed for the sufficient the light output being provided (S23). If the light output measured with the power meter 9 is smaller than the predetermined value W3 ("No" in S16), then whether the light output measured with the power meter 9 reaches or fall below the predetermined value W4 is subsequently determined, and if the light output measured therewith has reached or fallen below the predetermined value W4 ("Yes" in S17), then the adjustment process is completed for any one of the elements being defective (S24).

If the light output measured with the power meter 9 is greater than the predetermined value W4 ("No" in S17), then adjustments of the X and Y directions are finally made (S18). As a result, if the light output measured with the power meter 9 reaches or exceeds the predetermined value W3 ("Yes" in S19), then the adjustment process is completed for a sufficient light output being provided (S23). If the light output to be measured with the power meter 9 is smaller than the predetermined value W3 ("No" in S19), then this adjustment is completed for any one of the elements being defective (S24).

What is described thus far is the second adjustment process. Information of the relative position of the LD 1 and the solid-state laser element 4 for maximizing the light output, which has been determined through the second adjustment process and, is stored in a memory, not shown, within the controller 10.

In FIG. 10, the adjustment process is completed in a condition where the light output of the power meter 9 is equal to or greater than a given value, and the reason for this is to reduce the adjustment period of time. If time permitted and the active alignments will be made for all the axes, and determination of the position where the light output reaches a maximum level allows more accurate adjustment.

Upon completion of the first adjustment process, processing moves to the joining process. In the joining process, the position change mechanism 16 is first caused to move so that the dispenser 15 comes in a position located above the LD 1. Upon the movement of the position change mechanism 16, the dispenser 15 applies a proper amount of adhesive to a portion of the LD 1 where the LD 1 is caused to join the solid-state laser element. After application of the adhesive, the position change mechanism 16 is caused to move so that the solid-state laser element 4 comes in a position located above the LD 1, thereby causing the LD 1 and the laser element 4 to shift again to the relative position determined through the second adjustment process. After that, the first and second retainers 2 and 5 retains the LD 1 and the laser element 4 until the adhesive hardens at the above relative position, thereby allowing the LD 1 and the laser element 4 to be joined together. In the joining process, the energization of the LD 1 at the constant output power P2 can prevent the occurrence of the change of the relative position due to temperature change. What is described thus far is the joining process.

Execution of each process described above allows the LD 1 and the laser element 4 to move to a position where the light output reaches or exceeds the predetermined value (preferably, a maximum value) and to join them together, thereby providing a high-efficient light source. After joining the LD 1 and the laser element 4 together, the joined LD 1 and laser element is further joined to the SHG 18 shown as dotted lines shows to FIG. 8b. In this case, the high-efficient light source can also be provided by moving the joined LD 1 and laser element 4, and the SHG 18 to a position where the light output to be measured with the power meter 9 reaches or exceeds the predetermined value (preferably, the maximum value) and by joining them together.

As described above, in the light source manufacture apparatus according to Embodiment 1 of the present invention, the provision of the partial reflective mirror 7 at the exit end of the laser element 4 allows the optical resonator to be formed between the laser element 4 and the reflective mirror 7, so that the light output to be amplified, which thus provides sufficient light output to make the active alignment, thereby achieving high efficient optical coupling.

If there exists an angular deviation occurring in retaining the solid-state laser element 4 in a light source manufacture apparatus and/or an angular deviation inherent to the optical-film-coated surface of the laser element 4, the solid-state laser element is to be assembled or installed without knowledge of intrinsic performance of the laser element 4 because of the influence of such angular deviations, even when a sufficient light output can be produced by appropriate adjustments of the angles. Consequently, a problem is created in that if no desired output is produced when joining the SHG in the next step, whether this fault results from the laser element 4 or from SHG cannot be sorted out. However, since the light source manufacture apparatus according to Embodiment 1 of the present invention is made capable of adjusting the angle of inclination of the partial reflective mirror 7, laser oscillation can be generated with the effect of the angular deviation eliminated even when there exists an angular variation in retaining the laser element 4 and/or an angular deviation inherent to the optical film coated surface of the laser element 4 itself, which enables a uniform assessment of the performance of the laser element 4 and a characteristic control of pumping efficiency or the like of the solid-state laser element 4, regardless of the operating condition of the apparatus.

Another problem is that, in active alignment of such an optical element as having an optical waveguide and an LD 1, if the LD 1 emits light at a high output power level and the relative positional relationship between the LD 1 and the optical waveguide is significantly displaced from the optimum positional relationship, then portions other than the optical waveguide where the optical coupling is made is illuminated by the light emitted from the LD 1, thereby causing detriment and degradation to the optical element. However, the light source manufacture apparatus according to Embodiment 1 of the present invention is capable of preventing the detriment and degradation of the optical element, thereby reducing the occurrence of a defective optical element, by making again an optical axis adjustment, with the LD 1 emitting light at a high output power level, after an optical axis adjustment process of the laser element 4 with the LD 1 emitting light at a low output power level.

Note that while in the foregoing description, adjustments are made by moving, with the LD 1 retained by the moving stage 3, the LD 1 relatively with respect to the laser element 4, the adjustments may be made by moving, with the laser element 4 retained by shiftable means, the element 4 relatively with respect to the LD 1. In addition, the adjustments may be made by retaining every one of the optical elements to the respective moving means and shifting them to each other.

While in FIG. 1, because the solid-sate laser element 4 is disposed above the LD 1, the light output is measured with the power meter 9 disposed above the element 4, the invention is not limited to such a configuration with the optical axis of the LD 1 oriented in the perpendicular direction, but the LD 1 may be disposed so that its optical axis is oriented in the horizontal direction.

Moreover, while in FIG. 6 the mirror adjustment process is executed with the laser output set to P1, the mirror adjustment process may be made by setting the laser output to P2. While the present invention has been shown and described with reference to preferred embodiments thereof, it will be understood by those skilled in the art that various modifications and the like could be made thereto without departing from the spirit and scope of the invention.

What is claimed is:
1. An apparatus for manufacturing a light source, including a semiconductor laser that is energized to emit pump light, a solid-state laser element that generates a fundamental wave based on the pump light, the solid-state laser element having a first reflector that is provided on a surface thereof located toward the semiconductor laser, the first reflector reflecting the fundamental wave, and a wavelength conversion element that emits light with the wavelength of the fundamental wave converted into another wavelength, the apparatus comprising:
 a first retainer that retains the semiconductor laser;
 a second retainer that retains the solid-state laser element at a location that is illuminated by the pump light emitted from the semiconductor laser;
 a second reflector that is provided so as to face the first reflector of the solid-state laser element retained by the second retainer, the second reflector causing the fundamental wave emitted from the solid-state laser element to partially transmit therethrough and causing a rest of the fundamental wave to reflect thereby;
 a light output measurement device that measures an output of light having passed through the second reflector;
 a movement controller that causes the first retainer and/or the second retainer to move so that the semiconductor laser and the solid-state laser element are disposed at a relative position where the light output measured with the light output measurement device reaches or exceeds a predetermined value; and
 a joining device that joins the semiconductor laser and the solid-state laser element together at a relative position where the light output measured using the light output measurement device reaches or exceeds the predetermined value.

2. The apparatus for manufacturing a light source of claim 1, further comprising an angle adjuster that adjusts an angle of inclination of the second reflector so that a reflection surface of the second reflector is in parallel with that of the first reflector.

3. The apparatus for manufacturing a light source of claim 1, further comprising an electrical power controller that controls an electrical power energized to the semiconductor laser;
 wherein when a relative position between the semiconductor laser and the solid-state laser element is adjusted, the semiconductor laser is placed into a first condition where the electrical power controller causes the semiconductor laser to emit the pump light of the first output value smaller than an output that is to be produced when the semiconductor laser is operated as a part of the light source; with the first condition maintained, the movement controller causes the first retainer and/or the second retainer to move and thereafter places the semiconductor laser into a second condition where the electrical power controller causes the semiconductor laser to emit the pump light of a second output value substantially the same as an output that is produced when the semiconductor laser is operated as a part of the light source; and with the second condition maintained, the movement controller causes the first retainer and/or the second retainer to move so that a light output value measured by the light output measurement device reaches or exceeds a predetermined value.

4. The apparatus for manufacturing a light source of claim 2, further comprising an electrical power controller that controls an electrical power energized to the semiconductor laser, wherein when a relative position between the semiconductor laser and the solid-state laser element is adjusted, the semiconductor laser is placed into a first condition where the electrical power controller causes the semiconductor laser to emit the pump light of the first output value smaller than an output that is produced when the semiconductor laser is operated as a part of the light source; with the first condition maintained, the movement controller causes the first retainer and/or the second retainer to move and thereafter places the semiconductor laser into a second condition where the electrical power controller causes the semiconductor to emit the pump light of the second output value substantially the same as an output that is produced when the semiconductor laser is operated as a part of the light source; with the second condition maintained, the movement controller causes the first retainer and/or the second retainer to move so that a light output value measured by the light output measurement device reaches or exceeds a predetermined value; and the angle adjuster adjusts an angle of inclination of the second reflector, after the first retainer and/or the second retainer has been moved in the first condition where the semiconductor laser emits the pump light of the first output value, and before the first retainer and/or the second retainer is moved in the second condition where the semiconductor laser emits the pump light of the second output value.

5. The apparatus for manufacturing a light source of claim 3, wherein the first output value is set to approximately 30% of the second output value.

6. The apparatus for manufacturing a light source of claim 4, wherein the first output value is set to approximately 30% of the second output value.

7. A method of manufacturing a light source, the light source including a semiconductor laser that is energized to emit pump light, a solid-state laser element that generates a fundamental wave based on the pump light, the solid-state laser element having a first reflector that is provided on a surface thereof located toward the semiconductor laser, the first reflector reflecting the fundamental wave, and a wavelength conversion element that emits light with the wavelength of the fundamental wave converted into another wavelength, the light source manufacturing method, comprising:
- a first step of retaining the semiconductor laser;
- a second step of retaining the solid-state laser element that is illuminated by the pump light emitted from the semiconductor laser so that the first reflector faces a second reflector that causes the fundamental wave to partially transmit therethrough and causes a rest of the fundamental wave to reflect thereby;
- a step of energizing the semiconductor laser and then emitting pump light;
- a step of causing the first retainer and/or the second retainer to move so that the semiconductor laser and the solid-state laser element are disposed at a relative position where the output of light passing through the second reflector reaches or exceeds a predetermined value; and
- a step of joining the semiconductor laser and the solid-state laser element together at a relative position where the output of light passing through the second reflector reaches or exceeds the predetermined value.

8. The light source manufacturing method of claim 7, further comprising an angle adjustment step that adjusts an angle of inclination of the second reflector so that a reflection surface of the second reflector is in parallel with that of the first reflector.

9. The light source manufacturing method of claim 7,
wherein the energizing step is divided into a first sub-step of energizing the semiconductor laser so that the semiconductor laser emits pump light of the first output value smaller than an output that is produced when the semiconductor laser is operated as a part of the light source and a second sub-step of energizing the semiconductor laser so that the semiconductor laser emits pump light of a second output value substantially same as an output that is produced when the semiconductor laser is operated as a part of the light source; and
wherein the moving step is divided into a first moving sub-step that is executed together with the first energizing sub-step, and a second moving sub-step that is executed together with the second energizing sub-step.

10. The light source manufacturing method of claim 8,
wherein the energizing step is divided into a first sub-step of energizing the semiconductor laser so that the semiconductor laser emits pump light of the first output value smaller than an output that is produced when the semiconductor laser is operated as a part of the light source, and a second sub-step of energizing the semiconductor laser so that the semiconductor laser emits pump light of the second output value substantially same as an output that is produced when the semiconductor laser is operated as a part of the light source; and
wherein the moving step is divided into a first moving sub-step that is executed together with the first energizing sub-step, and a second moving sub-step that is executed together with the second energizing sub-step; and
wherein the angle adjusting step is executed after the first moving sub-step and before the second moving sub-step.

11. The light source manufacture method of claim 9, wherein the first output value is set to approximately 30% of the second output value.

12. The light source manufacture method of claim 10, wherein the first output value is set to approximately 30% of the second output value.

* * * * *